No. 816,666. PATENTED APR. 3, 1906.
C. B. KIMBALL.
WHEEL FOR AUTOMOBILES.
APPLICATION FILED MAR. 13, 1905.
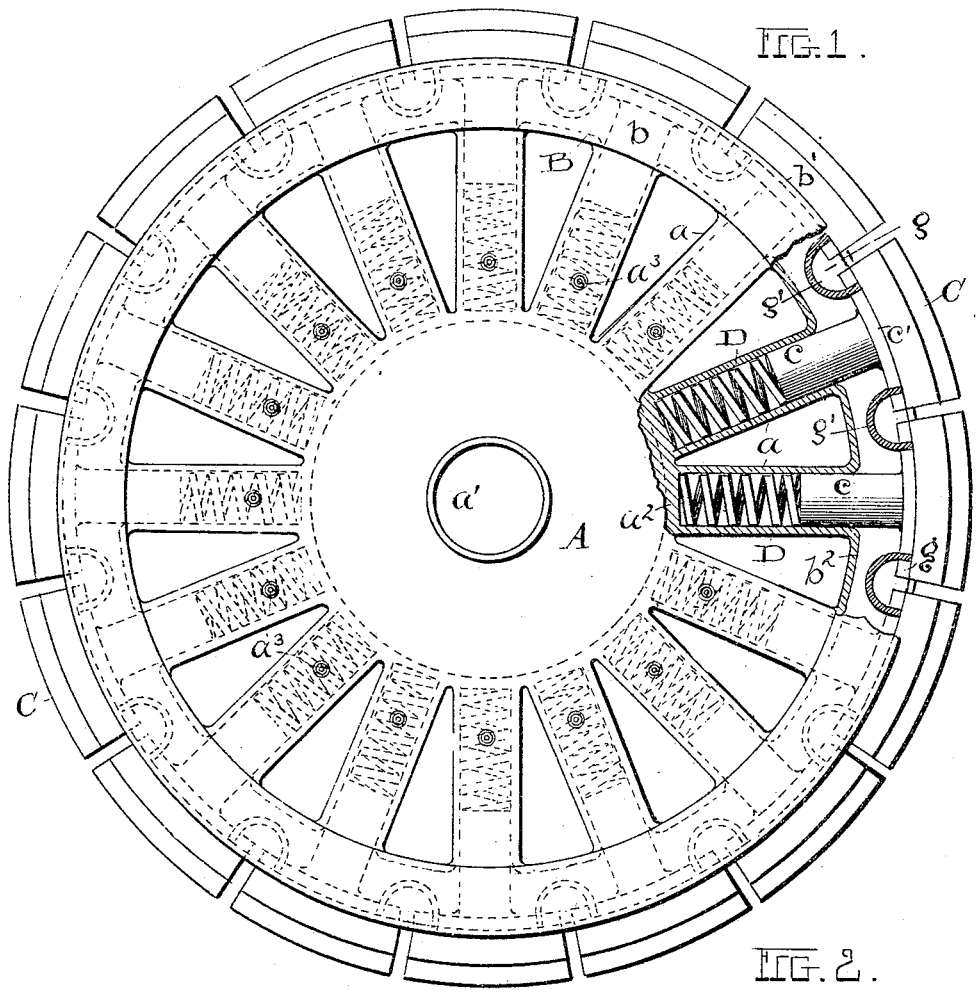
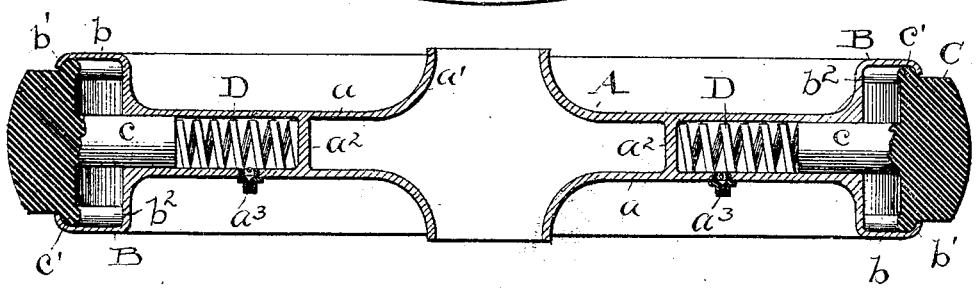
Witnesses
Inventor
Charles B. Kimball
By his Attorney H. J. Fisher

UNITED STATES PATENT OFFICE.

CHARLES B. KIMBALL, OF CLEVELAND, OHIO.

WHEEL FOR AUTOMOBILES.

No. 816,666.  Specification of Letters Patent.  Patented April 3, 1906.

Application filed March 13, 1905. Serial No. 249,716.

*To all whom it may concern:*

Be it known that I, CHARLES B. KIMBALL, a citizen of the United States, residing at Cleveland, in the county of Cuyahoga and State of Ohio, have invented certain new and useful Improvements in Wheels for Automobiles; and I do declare that the following is a full, clear, and exact description of the invention, which will enable others skilled in the art to which it appertains to make and use the same.

My invention relates to improvements in wheels for automobiles and the like; and the invention consists in a wheel having spring-supported segments constituting the tread or periphery thereof, all substantially as shown and described, and particularly pointed out in the claims.

In the accompanying drawings, Figure 1 is a side elevation of a complete wheel embodying my invention, and Fig. 2 is a central cross-section thereof.

As thus shown, the invention comprises a central body or hub part A, comprising a series of radial tubular spokes or arms $a$, which may have any suitable mechanical engagement or connection with the hub or central portion $a'$ of said part—that is, the tubes or tubular spokes $a$ may be integral with the hub or be set into the same in any effective way—and the said body part, including the said spokes or tubes $a$, may be formed in two equal halves, bolted or otherwise united, so as to be, in effect, as solid and unitary as if made in one piece. As shown, furthermore, there is a unitary rim B integral with spokes $a$ and constructed with right-angled side flanges $b$, the edges $b'$ of which curve or curl inward somewhat to confine the tire segments or sections C, and if the hub and spokes were cast or struck up in two parts the rim would be in two parts also and each part integral with that side of the entire wheel. A diaphragm or bridge $a^2$ is provided in each spoke, against or upon which rests a coiled or spiral spring D.

The tire as a whole is composed of a series of equal segments C, slightly spaced apart at their meeting ends to provide room for their joint depression successively more or less in pairs without contact at their ends, and each segment or section of tire has a solid stem $c$, projected and supported in or into one of the spokes $a$ against the contained spring D. The said springs are to be regarded as of such strength and resistance that they can carry the load as it comes onto any given wheel; but there is play afforded for the tire-segment both in rim B and in spokes $a$, and at last if the spring itself cannot carry the load alone the tire has ribs $c'$ along each edge which come down and form rests or stops on the shoulder or bearing-surface $b^2$ of rim B. The said tire segments or members C are of T shape and may be made of rubber of suitable hardness or, say, other suitable material.

Valved air-vents $a^3$ are provided in the several spokes $a$, and suitable dust or dirt pockets $g$ are provided inside between adjacent ends of tire-segments, which intercept any dirt that may work in between said segments and hold it where it will clear itself as the wheel revolves.

It will be noticed that all the tire-segments are independently mounted and depressible in the same proportion and are held in alinement by the flanges of rim B. The ribs $c'$ of the tire sections or segments C extend laterally outward, as well as inward, and thus form engaging portions for lips or locking edges $b'$.

It is to be observed that vent-valve $a^3$ provides only for intake of air and closes when the segment-stem is depressed, so that any air in the spoke will be driven out through the rim of the wheel about the segment or segments, and thus assist in keeping said parts clear of dirt and dust which might otherwise accumulate past said segments. Moreover, the air in said space, both in rim and spoke, cushions the tire. The stem $c$ never cuts off the valved passages $a^3$.

Dust-pockets $g$ are formed by connecting strips $g'$ of flexible material, such as soft rubber.

What I claim is—

1. A wheel provided with tubular spokes and a fixed rim about the outer ends of said spokes having right-angled sides, in combination with a tire consisting of a series of separate segments confined within the sides of said rim and provided with stems mounted in said spokes and laterally-projecting portions along their sides overlapped and engaged by said rim sides.

2. A wheel having tubular spokes and a rim with side walls about said spokes, in combination with a tire formed in segments corresponding to said spokes, said segments being provided with stems independently mounted in said spokes, and the outer edges of said side walls on the rim being engaged at the sides of said segments.

3. A wheel having tubular spokes, springs in said spokes and a rim about said spokes having walled sides and openings into the spokes, in combination with tire-segments in said rim provided with stems bearing on said springs and ribs on the sides of said segments engaged by the sides of said rim.

4. The wheel having tubular spokes and bridges on the inside of the same between their ends, springs on said bridges, and a rim about the wheel at the ends of said spokes having walled sides, in combination with tire-sections in said rim and having stems mounted in said spokes against said springs and sides engaged by the sides of said rim.

5. A wheel having a continuous flanged rim, in combination with a tire in sections mounted in said rim and said sections provided with ribs along their outer edges engaged by the edges of the rim, tubular spokes for said wheel, spring-pressed, guide-stems mounted in said spokes and flexible connections between said tire-sections.

6. In spring-tire wheels, a wheel having tubular spokes with valved air-inlets between their ends and a rim having openings coincident with said spokes, in combination with segmental tire-sections working in said rim and having stems entering said spokes above said valves, said spokes having diaphragms below said valves.

7. A wheel having tubular spokes and a continuous rim with right-angled walls at each side, in combination with a tire formed in segments spaced apart at their ends and confined within said rim, said segments having spring-supported stems independently mounted in said spokes and engaged along their sides within the edges of said rim, and flexible dust-excluding pieces connecting adjacent ends of said segments and of greater length than the normal space between said segments.

In testimony whereof I sign this specification in the presence of two witnesses.

CHARLES B. KIMBALL.

Witnesses:
H. T. FISHER,
C. A. SELL.